(12) United States Patent
Rowell

(10) Patent No.: US 6,519,301 B1
(45) Date of Patent: Feb. 11, 2003

(54) CIRCUITS, SYSTEMS, AND METHODS FOR PASSING REQUEST INFORMATION ACROSS DIFFERING CLOCK DOMAINS

(76) Inventor: Anthony S. Rowell, 11Manor Close, Irchester, Northamptonshire (GB), NN29 7ED ( * ) Notice: Subject to any disclaimer, the term of this patent is extended or adjusted under 35 U.S.C. 154(b) by 0 days.

(21) Appl. No.: 09/406,926

(22) Filed: Sep. 28, 1999

(51) Int. Cl.$^7$ ................................................. H04L 7/00
(52) U.S. Cl. ........................ 375/354; 327/141; 326/93
(58) Field of Search ................................ 375/354, 357, 375/224; 327/100, 141, 145, 291; 326/93, 136

(56) References Cited

U.S. PATENT DOCUMENTS 4,924,429 A * 5/1990 Kurashita et al. ............. 703/15

* cited by examiner

*Primary Examiner*—Jean Corrielus
(74) *Attorney, Agent, or Firm*—Pedro P. Hernandez; W. James Brady, III; Frederick J. Telecky, Jr.

(57) ABSTRACT

A system (20) for communicating request information from a first circuit (state machine A) operable according to a first clock domain ($CLK_A$) to a second circuit (state machine B) operable according to a second clock domain ($CLK_B$). In the system, the first clock domain differs from the second clock domain. The system comprises a flag circuit (F2) for storing a flag having a changeable state. The flag circuit comprises an input for receiving a toggle control signal (TOGGLE) and the state of the flag changes in response to assertion of the toggle control signal, where the first circuit is operable to assert the toggle signal to communicate the request information to the second circuit. The system further comprises a synchronizing circuit ($S_{CD}$) having an input coupled to an output of the flag circuit and for receiving the state of the flag. The system further comprises a detection circuit (ED) having an input coupled to an output of the synchronizing circuit. The detection circuit is operable to detect a change in the state of the flag and to output a detection control signal (P) to the second circuit in response to detection a change in the state of the flag.

18 Claims, 1 Drawing Sheet

CIRCUITS, SYSTEMS, AND METHODS FOR PASSING REQUEST INFORMATION ACROSS DIFFERING CLOCK DOMAINS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to digital data circuits, and are more particularly directed to systems requiring the passage of information between different clock domains.

Digital systems often include circuits operating at different clock rates, and often there is a need to communicate information between such circuits while accommodating the accompanying change in clock rate between the circuits. Such information may include one or more bits in the form of control signals, flags, or other state indicators. In any event, the bit(s) cannot be directly communicated between circuits operating at different clock speeds due to potential metastability problems. By way of further explanation, such metastability problems may occur because if a circuit operating a first clock speed attempts to sample a bit state from a circuit operating at a second clock speed, there is the possibility that the sampled bit state may change at the instant it is being sampled. If this occurs, the resulting sample may be unstable, possibly fluctuating between low and high before settling on one of the values in a non-deterministic manner. Indeed, the resulting sample also may take on a value that is neither a digital high (e.g., 1) nor a digital low (e.g., 0) which is clearly an undesirable and problematic result. Lastly, note that the preceding discussion regarding passing information across different clock speeds also applies in general to circuits operating at the same clock speeds, but where the circuits are asynchronous with respect to one another. In other words, in this instance, a data bit cannot be directly passed from one circuit to another asynchronously operating circuit without the risk of an erroneous or invalid sampling of that bit. Given the two different scenarios now provided (i.e., different clock speeds or same but asynchronous clock speeds), and for purposes of definition for the remainder of this document, both may be collectively referred to as examples of crossing clock domains. In other words, both examples demonstrate a first circuit operating in a first clock domain and passing information to a second circuit operating in a second and different clock domain.

By way of further background, FIG. 1 illustrates a block diagram of a prior art system 10 which addresses the cross-domain issues raised above, and more particularly system 10 illustrates an example where different clock speeds are used by different circuits and information is communicated between those circuits. System 10 includes two state machines and, for sake of reference, a first is shown as state machine A while a second is shown as state machine B. Each of state machines A and B is clocked according to a respective clock signal $CLK_A$ and $CLK_B$, where these clock signals are at different speeds. As an example, assume that $CLK_A$ equals 25 MHz while $CLK_B$ equals 100 MHz. Accordingly, and as detailed below, system 10 represents an example of two circuits, which are illustrated by way of example as state machines, where it is desired for request information to be communicated between those circuits. For reasons detailed later, the passage of such information in the prior art requires a first communication path from state machine A to state machine B, and a second communication path from state machine B to state machine A. Each of these paths is described separately, below.

Looking to the path of communication from state machine A to state machine B, state machine A has a SET control signal and a CLEAR control signal coupled to a flag F1. Flag F1 may represent various types of information, where for the present example assume that flag F1 is a one-bit indicator from state machine A that, in response to a setting of the flag, state machine B is to take some action. The action of state machine B may be completely unrelated to state machine A or, alternatively, it may related to state machine A (e.g., such as state machine B taking action with respect to data, where the data also relates in some manner to state machine A). The state of flag F1 is connected to an input of a synchronizer $S_{AB}$, and the output of synchronizer $S_{AB}$ is connected to state machine B. Synchronizer $S_{AB}$ is constructed such that its input is connected to the data input of a latch $L_{AB1}$, and the output of latch $L_{AB1}$ is connected to the data input of a latch $L_{AB2}$. The output of latch $L_{AB2}$ provides the output of synchronizer $S_{AB}$ and, thus, as stated above, is connected to state machine B. Lastly, both of latches $L_{AB1}$ and $L_{AB2}$ are clocked by $CLK_B$.

Looking to the path of communication from state machine B to state machine A, note that state machine B is also operable to provide a one-bit CONFIRM control signal to state machine A via a synchronizer $S_{BA}$ where the functionality of the CONFIRM signal is described later. More particularly with respect to the CONFIRM signal, it is connected to the input of a synchronizer $S_{BA}$, and the output of synchronizer $S_{BA}$ is connected to state machine A. Synchronizer $S_{BA}$ is constructed such that its input is connected to the data input of a latch $L_{BA1}$, and the output of latch $L_{BA1}$ is connected to the data input of a latch $L_{BA2}$. The output of latch $L_{BA2}$ provides the output of synchronizer $S_{BA}$ and, thus, as stated above, is connected to state machine A. Lastly, both of latches $L_{BA1}$ and $L_{BA2}$ are clocked by $CLK_A$.

The operation of system 10 is now described, with particular emphasis on the notion of communicating information across clock domains from state machine A to state machine B. By way of example, assume that the cross-domain information is the state of flag F1. Further, when the state of flag F1 is changed by state machine A, the change ultimately is detected by state machine B so that in response to that change state machine B may take a corresponding action. Thus, assume at a given time that state machine A is ready to request an action of state machine B. At this time, state machine A indicates this status by asserting its SET control signal and thereby setting flag F1. At the first assertion of $CLK_B$ following the setting of flag F1, latch $L_{AB1}$ latches the set flag. At the second assertion of $CLK_B$ following this assertion of SET, latch $L_{AB2}$ latches the set flag F1 from latch $L_{AB1}$, and thereby provides it to state machine B. Note, therefore, that communication of the set flag consumes two $CLK_B$ periods. Next, and in response to the set flag F1, state machine B takes the necessary action in response to the set flag F1.

After state machine B has taken its action, state machine B is required to acknowledge to state machine A that state machine B has responded to the set flag F1. Accordingly, state machine B provides such an acknowledgment via its CONFIRM signal and through synchronizer $S_{BA}$. More particularly, state machine B asserts the CONFIRM signal and, at the first assertion of $CLK_A$ following the assertion of the CONFIRM signal, latch $L_{BA1}$ latches the asserted CONFIRM signal. At the second assertion of $CLK_A$ following the assertion of the CONFIRM signal, latch $L_{BA2}$ latches the asserted CONFIRM signal, and thereby provides it to state machine A. Further with respect to this communication, however, note the required use of clock cycles in this regard. Specifically, recall that synchronizer $S_{BA}$ is clocked by $CLK_A$ and, hence, at 25 MHz. Thus, when state machine B asserts the CONFIRM signal, it cannot assert it only for one period of $CLK_B$ because, in that case, there is a chance that $CLK_A$ will not transition during that one period of $CLK_B$ and, if this failure occurs, then the asserted CONFIRM signal will not be latched by latch $L_{BA1}$. Indeed, given the example speeds of $CLK_A$ equal to 25 MHz and $CLK_B$ equal to 100 MHz, one skilled in the art should appreciate that to ensure proper latching of the CONFIRM signal state machine B must maintain its assertion of that signal for at least five cycles of $CLK_B$, because in doing so there is then a sufficient time period during which the CONFIRM signal is asserted so that $CLK_A$ will assert at least once during that time period. Finally, note that communication of the CONFIRM signal to state machine A also consumes two $CLK_A$ periods so that the signal may pass through the latches of synchronizer $S_{BA}$.

In addition to the acknowledgment from state machine B to state machine A, state machine B also controls the CONFIRM signal to ensure that it is de-asserted after it is asserted because only after the CONFIRM signal is de-asserted will state machine A assert its CLEAR control signal to flag F1 and thereby clear that flag. This additional requirement is imposed in the prior art because without it there would be the risk that state machine A could assert flag F1 two times for two different actions to be taken by state machine B, but with the result that the two asserted flags would overlap and thereby be perceived by state machine B as a single request to take action. In any event, attention is now directed to the required use of clock cycles with respect to the de-assertion of the CONFIRM signal by state machine B. Specifically, because the de-assertion also is latched through synchronizer $S_{BA}$, then for the same reasons set forth above with respect to state machine B asserting the CONFIRM signal, the de-assertion of that signal by state machine B also must be maintained for at least five periods of $CLK_B$ (again, to ensure that $CLK_A$ is asserted at least one during the de-assertion of CONFIRM to thereby latch the de-assertion into latch $L_{BA1}$). Finally, note that clearing of the CONFIRM signal to state machine A also consumes two $CLK_A$ periods so that the cleared signal may pass through the latches of synchronizer $S_{BA}$.

Given the preceding, the present inventor has recognized that the entire number of clock cycles given the configuration and requirements of system 10 may be considerable from the time between an instance where state machine A requests an action to be taken by state machine B, and the next instance where state machine A is able to again request an action to be taken by state machine B. Indeed, these delays can be problematic when trying to pass information at high repetition rates. Finally, it is noted for the example numbers set forth above that the absolute minimum delay is 10 periods of $CLK_B$ per action item to be taken by state machine B, and this further assumes that state machines A and B take zero time.

In view of the above, there arises a need to address the drawbacks of the prior art and to provide a system that efficiently permits the passage of information between different clock domains, and this need is satisfied by the preferred embodiment described below.

BRIEF SUMMARY OF THE INVENTION

In the preferred embodiment, there is a system for communicating request information from a first circuit operable according to a first clock domain to a second circuit operable according to a second clock domain. In the system, the first clock domain differs from the second clock domain. The system comprises a flag circuit for storing a flag having a changeable state. The flag circuit comprises an input for receiving a toggle control signal and the state of the flag changes in response to assertion of the toggle control signal, where the first circuit is operable to assert the toggle signal to communicate the request information to the second circuit. The system further comprises a synchronizing circuit having an input coupled to an output of the flag circuit and for receiving the state of the flag. The system further comprises a detection circuit having an input coupled to an output of the synchronizing circuit. The detection circuit is operable to detect a change in the state of the flag and to output a detection control signal to the second circuit in response to detection a change in the state of the flag. Other circuits, systems, and methods are also disclosed and claimed.

DETAILED DESCRIPTION OF THE INVENTION

Figure 1:
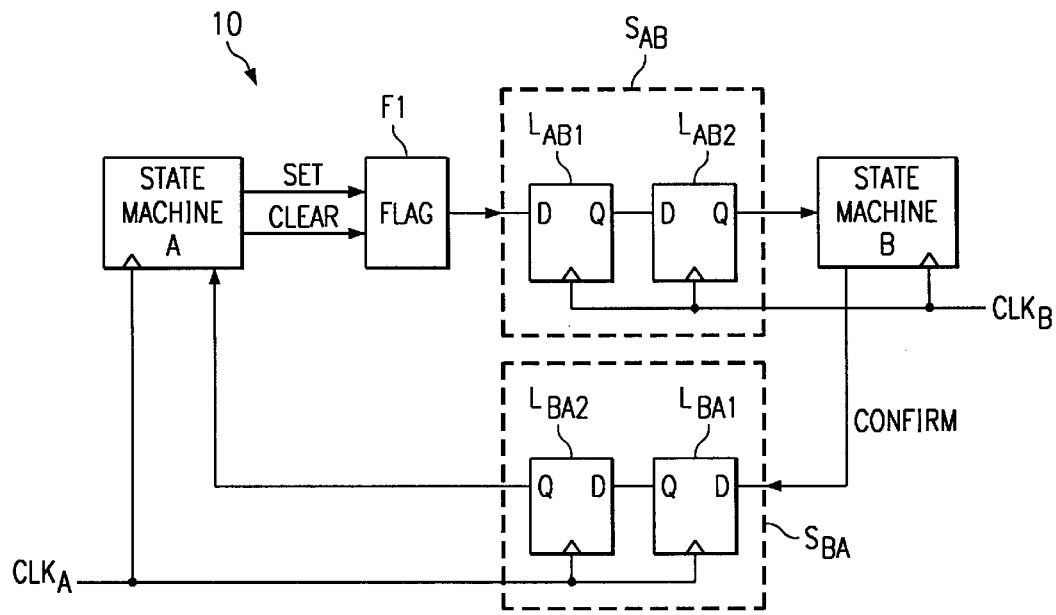
FIG. 1 illustrates a block diagram of a prior art system which includes two state machines passing an information flag between them and in view of differing clock speeds for each state machine.

FIG. 1 was described above in the Background Of The Invention section of this document.

Figure 2:
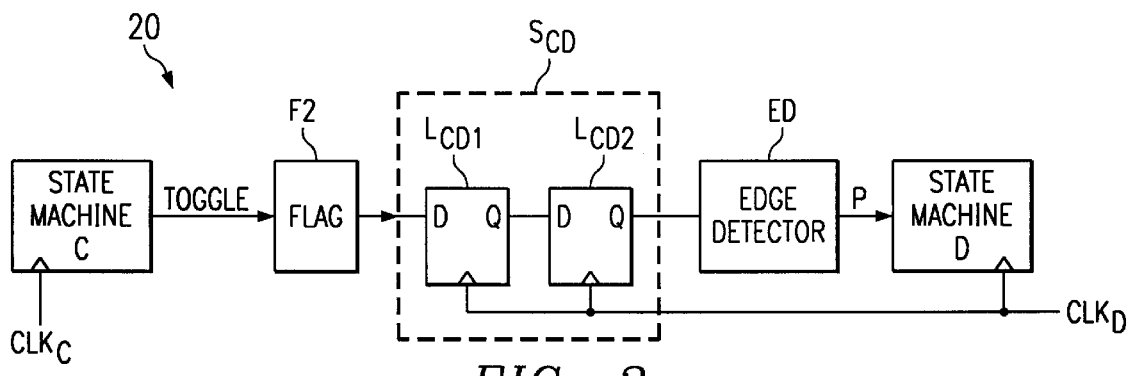
FIG. 2 illustrates a schematic of a dual clock domain system in accordance with the preferred embodiment.

FIG. 2 illustrates a schematic of a dual clock domain system 20 in accordance with the preferred embodiment. Like system 10 of the prior art, system 20 in FIG. 2 also includes two circuits operating at different clock speeds and shown by way of example as state machines; however, the letter designations of the state machines are changed to include a state machine C and a state machine D so as not to confuse the discussion relative to the earlier prior art description. Looking in more detail to system 20, each of state machines C and D is clocked according to a respective clock signal $CLK_C$ and $CLK_D$, where these clock signals are at different speeds. As an example, the same speeds from the earlier prior art example are used here, so assume that $CLK_C$ equals 25 MHz while $CLK_D$ equals 100 MHz. Accordingly, and as detailed below, system 20 represents an example of two circuits, which are illustrated by way of illustration as state machines, where it is desired for request information to be communicated between the different clock domains of those circuits.

Figure 3:
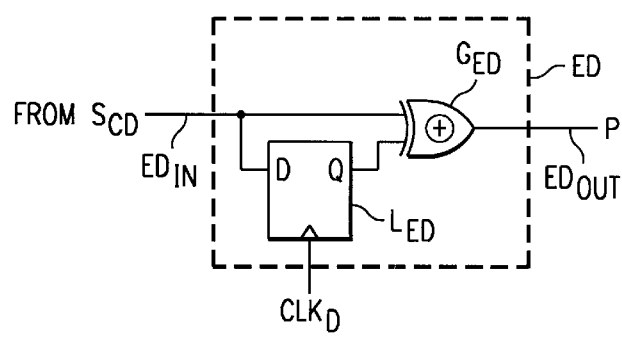
FIG. 3 illustrates a schematic of the edge detector shown in FIG. 2.

Looking to the path of communication from state machine C to state machine D and across the clock domains of those machines, state machine A has a TOGGLE control signal coupled to a flag F2. Flag F2 may represent various types of request information, where again as an example assume that flag F2 is a one-bit indicator from state machine C to state machine D to take some action. The state of flag F2 is connected to an input of a synchronizer $S_{CD}$. Synchronizer $S_{CD}$ is constructed such that its input is connected to the data input of a latch $L_{CD1}$, and the output of latch $L_{CD1}$ is connected to the data input of a latch $L_{CD2}$. The output of latch $L_{CD2}$ provides the output of synchronizer $S_{CD}$ and is connected to the input of an edge detector ED, where edge detector ED may be constructed in various manners by one skilled in the art given its functionality as detailed later, or as also shown in FIG. 3. The output of edge detector ED is connected to state machine D. Lastly, both of latches $L_{CD1}$ and $L_{CD2}$ are clocked by $CLK_D$.

The operation of system 20 is now described, with emphasis on the notion of communicating information across clock domains from state machine C to state machine D. Here again, the information communicated between state machines is represented by a flag F2. However, in contrast to the prior art, for system 20 there is no notion of setting and clearing flag F2, that is, where one state of the flag is a take action state and another (i.e., complementary) state is a cleared state. Instead, state machine C indicates to state machine D that an action should be taken by state machine D in response to any change of state in flag F2. Thus, where flag F2 is embodied by a single binary bit, and when state machine C seeks to request that state machine D take an action, then state machine C asserts its TOGGLE control signal which thereby changes the state of flag F2. Accordingly, one skilled in the art should appreciate that that an indication from state machine C to state machine D that action is required may be made by changing the flag F2 state from any present state (i.e., 0 or 1) to a different state (i.e., 1 or 0, respectively).

Continuing with the operation of system 20, assume at a given time state machine C is ready to request that an action be taken by state machine D. At this time, state machine A indicates this status by asserting its TOGGLE control signal and thereby changing the stage of flag F2. By way of example for facilitating the present discussion, assume therefore that prior to this time the value of flag F2 equals 1 and, thus, the assertion of the TOGGLE control signal by state machine C switches the stage of flag F2 so that it now equals 0. At the first assertion of $CLK_D$ following the state change of flag F2, latch $L_{CD1}$ latches the new state (i.e., of 0) of flag F2. At the second assertion of $CLK_D$ following this assertion of TOGGLE, latch $L_{CD2}$ latches the new state of flag F2 from latch $L_{CD1}$, and thereby provides it to edge detector ED which responds as detailed below.

In the preferred embodiment, edge detector ED is constructed to output a pulse P in response to any transition change at its input. Thus, the transition causing pulse P may be either a low-to-high transition or a high-to-low transition. Such a circuit may be formed in various fashions, and its operation is further illustrated by examining an example of a circuit for forming edge detector ED as is shown in FIG. 3, and as now described. Edge detector ED includes an input $ED_{IN}$ which, as shown in FIG. 2, receives the output of synchronizer $S_{CD}$. Input $ED_{IN}$ is connected to one input of an exclusive OR ("XOR") logic gate $G_{ED}$, and the output of XOR logic gate $G_{ED}$ provides the output $ED_{OUT}$ for edge detector ED, which recall from FIG. 2 provides pulse P to state machine D. Input $ED_{IN}$ is also connected to the data input of a latch $L_{ED}$, and latch $L_{ED}$ is clocked by $CLK_D$. Given the circuitry shown in FIG. 3, one skilled in the art should readily appreciate its operation. Specifically, assuming a first state for flag F2, then that first state eventually passes through synchronizer $S_{CD}$, is latched by a rising edge of $CLK_D$ into latch $L_{ED}$, and is output by latch $L_{ED}$ to XOR gate $G_{ED}$. Assume further that flag F2 is toggled to change to a second state; in response, the second state passes through synchronizer $S_{CD}$ and is connected to XOR gate $G_{ED}$. At this point, therefore, the inputs to XOR gate $G_{ED}$ differ and, as a result and as is known for an XOR gate, XOR gate $G_{ED}$ outputs a high in response to its differing inputs; accordingly, this high constitutes an assertion of pulse P. At the next rise in $CLK_D$, the second state of flag F2 is latched by latch $L_{ED}$ and output to XOR gate $G_{ED}$, thereby causing both inputs to XOR gate $G_{ED}$ to be the same. Accordingly, at this point the output of XOR gate $G_{ED}$ goes low, thereby ending the duration of the asserted pulse P. Given the operation of edge detector ED, and retuning now to the overall operation of system 20, recall the preceding example where the state of flag F2 is changed from 1 to 0 by an assertion of the TOGGLE control signal and following two periods of $CLK_D$ this changed state is applied to edge detector ED. In response, therefore, edge detector ED outputs pulse P to state machine D.

Following the above, state machine D takes the appropriate action in response to receiving pulse P. Thus, the entire sequence from request to action involves as assertion by state machine C of TOGGLE, two $CLK_D$ cycles so the changed flag F2 passes through synchronizer $S_{CD}$, a response and output of pulse P by edge detector ED. Further, at this point the transfer of the request information from state machine C to state machine D is complete in the preferred embodiment, and state machine D takes the requested action.

Given the preferred embodiment as described above, one skilled in the art should appreciate various benefits that it provides over system 10 of the prior art. As a first benefit, note that there is no return communication or confirmation path from state machine D to state machine C; as a result, there are no structural or timing requirements associated with such a path. For example, state machine D is not required to return a confirmation signal. As another benefit, state machine C need only take one action associated with the request, that is, to assert the TOGGLE control signal—this is in contrast with the setting, awaiting, and clearing steps required of state machine A in the prior art. As another benefit, state machine D is not required to ensure that a flag is cleared after it sends its confirmation signal. As still another benefit, in the example where $CLK_C$ is 25 MHz and $CLK_D$ is 100 MHz, then state machine C can request actions of state machine D during successive periods of $CLK_C$; this is in far contrast to the prior art as described above which requires the sending state machine to await a confirmation of the request, and the additional time in clearing its flag. Indeed, this ability for state machine C to send requests in successive clock cycles holds true for other instances where $CLK_C$ is less than $CLK_D$. Further in this regard, however, note that if $CLK_D$ is slower than $CLK_C$, then in the preferred embodiment state machine C is permitted to toggle its flag F2 only at a rate that is adjusted due to the differences. For example, if $CLK_C$ were equal to 100 MHz and $CLK_D$ were equal to 25 MHz, then state machine C limits its rate of asserting TOGGLE to a speed of less than 25 MHz. However, if the same reversal of speeds are applied to the prior art, there is no net gain due to the dual paths implemented in that system. Thus, in any event the entire process of requesting an action in the preferred embodiment is achieved in less time than compared to the prior art.

From the above, it may be appreciated that the above embodiments provide a configuration for passing request information across differing clock domains. Further, note that this operation is achieved using a solution that requires less hardware and operates in less time than the prior art approach described in the Background Of The Invention section of this document. Further, while the while the present embodiments have been described in detail, various substitutions, modifications or alterations could be made to the descriptions set forth above without departing from the inventive scope. For example, while the example provided above illustrates the passage from a first state machine at a first frequency to a second state machine at a second frequency, recall that the inventive teachings also may apply to other instances where there is a change in clock domain that involves same speed clocks, but where those clocks are asynchronous with respect to one another. As another example, while the preferred embodiment is shown with a minimal amount of hardware, its methodology may be implemented using other circuits as will be ascertainable by one skilled in the art. Accordingly, these examples as well as the preceding discussion further illustrates the inventive scope, as is defined by the following claims.

What is claimed is:

1. A system for communicating request information from a first circuit operable according to a first clock domain to a second circuit operable according to a second clock domain, wherein the first clock domain differs from the second clock domain, the system comprising:
    a flag circuit for storing a flag having a changeable state, wherein the flag circuit comprises an input for receiving a toggle control signal and the state of the flag changes in response to assertion of the toggle control signal, wherein the first circuit is operable to assert the toggle signal to communicate the request information to the second circuit;
    a synchronizing circuit having an input coupled to an output of the flag circuit and for receiving the state of the flag; and
    a detection circuit having an input coupled to an output of the synchronizing circuit, wherein the detection circuit is operable to detect a change in the state of the flag and to output a detection control signal to the second circuit in response to detection a change in the state of the flag.

2. The system of claim 1 wherein the second circuit takes an action in response to the detection control signal.

3. The system of claim 2 wherein the detection control signal comprises a pulse having a fixed duration.

4. The system of claim 1 wherein the synchronizing circuit is operable in response to the second clock domain.

5. The system of claim 1 wherein the synchronizing circuit comprises:
    a first latch having a data input coupled to receive the state of the flag and coupled to be clocked by the second clock domain; and
    a second latch having a data input coupled to an output of the first latch and an output coupled to the input of the detection circuit, wherein the second latch is coupled to be clocked by the second clock domain.

6. The system of claim 1:
    wherein the second circuit takes an action in response to the detection control signal;
    wherein the detection control signal comprises a pulse having a fixed duration; and
    wherein the synchronizing circuit is operable in response to the second clock domain and comprises:
        a first latch having a data input coupled to receive the state of the flag and coupled to be clocked by the second clock domain; and
        a second latch having a data input coupled to an output of the first latch and an output coupled to the input of the detection circuit, wherein the second latch is coupled to be clocked by the second clock domain.

7. The system of claim 6 wherein the second circuit does not return a signal to the first circuit in response to the change in the state of the flag.

8. The system of claim 1:
    wherein the first clock domain comprises a first clock signal having a first frequency; and
    wherein the second clock domain comprises a second clock signal having a second frequency different than the first frequency.

9. The system of claim 8:
    wherein the second frequency is greater than the first frequency;
    wherein the first circuit is operable to assert the toggle signal a first time to communicate the request information to the second circuit during a first period of the first frequency; and
    wherein the first circuit is operable to assert the toggle signal a second time to communicate the request information to the second circuit during a second period of the first frequency, wherein the second period immediately follows the first period.

10. The system of claim 1:
    wherein the first clock domain comprises a first clock signal having a first frequency;
    wherein the second clock domain comprises a second clock signal having a second frequency equal to the first frequency; and
    wherein the first clock signal is asynchronous to the second clock signal.

11. The system of claim 1 wherein the second circuit does not return a signal to the first circuit in response to the change in the state of the flag.

12. A digital system, comprising:
    a first circuit operable according to a first clock domain;
    a second circuit operable according to a second clock domain, wherein the first clock domain differs from the second clock domain and wherein the first circuit is operable to communicate request information to the second circuit;
    a flag circuit for storing a flag having a changeable state, wherein the flag circuit comprises an input for receiving a toggle control signal and the state of the flag changes in response to assertion of the toggle control signal, wherein the first circuit is operable to assert the toggle signal to communicate the request information to the second circuit;
    a synchronizing circuit having an input coupled to an output of the flag circuit and for receiving the state of the flag; and
    a detection circuit having an input coupled to an output of the synchronizing circuit, wherein the detection circuit is operable to detect a change in the state of the flag and to output a detection control signal to the second circuit in response to detection a change in the state of the flag.

13. The system of claim 12 wherein the synchronizing circuit is operable in response to the second clock domain.

14. The system of claim 13 wherein the synchronizing circuit comprises:
    a first latch having a data input coupled to receive the state of the flag and coupled to be clocked by the second clock domain; and a second latch having a data input coupled to an output of the first latch and an output coupled to the input of the detection circuit, wherein the second latch is coupled to be clocked by the second clock domain.

15. The system of claim 12 wherein the second circuit does not return a signal to the first circuit in response to the change in the state of the flag.

16. The system of claim 12:

wherein the first clock domain comprises a first clock signal having a first frequency; and wherein the second clock domain comprises a second clock signal having a second frequency different than the first frequency.

17. The system of claim 16:

wherein the second frequency is greater than the first frequency;

wherein the first circuit is operable to assert the toggle signal a first time to communicate the request information to the second circuit during a first period of the first frequency; and wherein the first circuit is operable to assert the toggle signal a second time to communicate the request information to the second circuit during a second period of the first frequency, wherein the second period immediately follows the first period.

18. The system of claim 12:

wherein the first clock domain comprises a first clock signal having a first frequency;

wherein the second clock domain comprises a second clock signal having a second frequency equal to the first frequency; and wherein the first clock signal is asynchronous to the second clock signal.

* * * * *